US012617053B2

(12) United States Patent
Yamamoto et al.

(10) Patent No.: US 12,617,053 B2
(45) Date of Patent: May 5, 2026

(54) MIST COLLECTOR AND MACHINE TOOL

(71) Applicant: DMG MORI CO., LTD., Nara (JP)

(72) Inventors: Kosuke Yamamoto, Nara (JP); Kenjiro Iga, Nara (JP); Masahiro Kosuge, Nara (JP)

(73) Assignee: DMG MORI CO., LTD., Nara (JP)

( * ) Notice: Subject to any disclaimer, the term of this patent is extended or adjusted under 35 U.S.C. 154(b) by 524 days.

(21) Appl. No.: 18/023,353

(22) PCT Filed: Aug. 27, 2020

(86) PCT No.: PCT/JP2020/032315

§ 371 (c)(1),
(2) Date: Feb. 25, 2023

(87) PCT Pub. No.: WO2022/044188

PCT Pub. Date: Mar. 3, 2022

(65) Prior Publication Data

US 2023/0311262 A1      Oct. 5, 2023

(51) Int. Cl.
B01D 33/15        (2006.01)
B01D 46/00        (2022.01)
B23Q 11/10        (2006.01)

(52) U.S. Cl.
CPC .......... B23Q 11/1069 (2013.01); B01D 33/15 (2013.01); B01D 46/0056 (2013.01)

(58) Field of Classification Search
CPC ............ B23Q 11/1069; B23Q 11/0891; B23Q 11/0046; B23Q 11/08; B01D 46/003; B01D 46/0056; B01D 46/71; B01D 46/10; B01D 33/06; B01D 33/15; B01D 33/155; B01D 33/27; B01D 46/0031; B01D 46/0052; Y02P 70/10
See application file for complete search history.

(56) References Cited

U.S. PATENT DOCUMENTS

| | | | |
|---|---|---|---|
| 913,636 A * | 2/1909 | Gardiner | |
| 5,154,742 A * | 10/1992 | Gault .................... | B01D 45/08 |
| | | | 55/320 |
| 2005/0235617 A1* | 10/2005 | Read .................. | B01D 46/2414 |
| | | | 55/482 |

FOREIGN PATENT DOCUMENTS

| | | | | |
|---|---|---|---|---|
| CN | 202846253 U | * | 4/2013 | ............. Y02P 70/10 |
| CN | 210088934 U | | 2/2020 | |
| EP | 2527025 A1 | | 11/2012 | |
| EP | 3006159 A1 | * | 4/2016 | ............. B08B 15/00 |
| JP | S58-31023 U | | 3/1983 | |
| JP | H06-036742 U | | 5/1994 | |
| JP | 2007021321 A | * | 2/2007 | ............. B01D 46/24 |

(Continued)

OTHER PUBLICATIONS

English translation of CN_202846253_U, Apr. 3, 2013. (Year: 2013).*

(Continued)

*Primary Examiner* — Joseph W Drodge
(74) *Attorney, Agent, or Firm* — IP Business Solutions, LLC.

(57)        ABSTRACT
A mist collector includes: a filter that collects mist; a nozzle including an ejection port capable of ejecting a coolant, the nozzle being disposed to cause the ejection port to be opposite to the filter; and a motor that causes the filter to move, to cause a position on the filter to which the ejection port is opposite to change.

7 Claims, 6 Drawing Sheets

(56) References Cited

FOREIGN PATENT DOCUMENTS

| JP | 2008246366 | A | * | 10/2008 | ............ | B01D 46/24 |
| JP | 2012055839 | A | | 3/2012 | | |
| JP | 2013053540 | A | * | 3/2013 | | |
| JP | 6375424 | B1 | * | 8/2018 | ............ | B01D 33/44 |
| KR | 101775481 | B1 | * | 9/2017 | ............ | B01D 33/68 |
| WO | WO-2021026323 | A1 | * | 2/2021 | ............ | B01D 45/16 |

OTHER PUBLICATIONS

English translation of JP_2007021321_A, Feb. 1, 2007. (Year: 2007).*

English translation of JP_2008246366_A, Oct. 16, 2008. (Year: 2008).*

English translation of JP_6375424_B, Aug. 15, 2018. (Year: 2018).*

English translation of KR_10-1775481_B, Sep. 7, 2017. (Year: 2017).*

English translation of JP 2013053540A Mar. 21, 2013. (Year: 2013).*

* cited by examiner

MIST COLLECTOR AND MACHINE TOOL

TECHNICAL FIELD

The present invention relates to a mist collector and a machine tool.

BACKGROUND ART

For example, Japanese Utility Model Laying-Open No. H6-36742 (PTL 1) discloses a mist scattering prevention device for a machine tool. The device includes an overall cover provided with an opening portion, an automatic opening and closing cover disposed in the opening portion, a plurality of discharge ports and a plurality of suction ports provided on two respective opposite sides of the opening portion, and a mist collection device connected to the suction ports via a duct. When the automatic opening and closing cover is opened, an air curtain is formed by providing airflows from the discharge ports toward the suction ports.

CITATION LIST

Patent Literature

PTL 1: Japanese Utility Model Laying-Open No. H6-36742

SUMMARY OF INVENTION

Technical Problem

As disclosed in PTL 1 described above, a mist collector is known which is used for collecting mist generated in a machining area. When a workpiece is machined using a coolant in a machine tool, the coolant heated by heat generated along with the machining becomes a mist form (mist). Discharge of such oil mist to the outside of the machine tool leads to a cause of contaminating the inside of a factory. The mist collector is thus installed in the machine tool.

The mist collector is provided with a filter for collecting the oil mist. However, it is assumed that the mist collector receives, in addition to the oil mist, fine chips and the like that are generated along with workpiece machining and that then flow into the mist collector. The fine chips and the like may thus cause clogging of the filter. This may impair efficient collection of the oil mist.

It is therefore an object of the present invention to solve the above problem, and particularly, to provide a mist collector that can prevent clogging of a filter, and a machine tool that includes such a mist collector.

Solution to Problem

A mist collector according to the present invention includes: a filter that collects mist; a nozzle including an ejection port capable of ejecting a fluid, the nozzle being disposed to cause the ejection port to be opposite to the filter; and a drive portion that causes at least one of the filter and the nozzle to move, to cause a position on the filter to which the ejection port is opposite to change.

According to the mist collector configured as described above, the fluid is ejected from the ejection port toward the filter while the position on the filter to which the ejection port is opposite is caused to change by causing at least one of the filter and the nozzle to move by the drive portion. This can clean the filter and prevent clogging of the filter.

Preferably, the nozzle is fixed. The drive portion causes the filter to move.

According to the mist collector configured as described above, it is possible to prevent clogging of the filter with a simple configuration by configuring the nozzle to be a fixed type.

Preferably, the filter has a disk shape centered on a predetermined axis, and includes a filter surface orthogonal to the predetermined axis. The drive portion causes the filter to rotate about the predetermined axis. The nozzle is disposed to cause the ejection port to be opposite to the filter surface.

According to the mist collector configured as described above, it is possible to reduce the mist passing through the filter by causing the filter to rotate, when the mist is collected by the filter. This allows the mist to be efficiently collected by the filter. It is also possible to change the position on the filter to which the ejection port is opposite by causing the filter to rotate, when the fluid is ejected from the ejection port toward the filter surface. This allows the filter to be efficiently cleaned.

Preferably, the nozzle includes a plurality of the ejection ports arranged along a radial direction of the predetermined axis.

According to the mist collector configured as described above, it is possible to eject the fluid toward a wider area of the filter surface, along with the rotation of the filter.

Preferably, the mist collector further includes a fan that generates an airflow passing through the filter. The drive portion causes the fan to rotate while the drive portion causes the filter to rotate.

According to the mist collector configured as described above, it is possible to make the configuration of the mist collector simple by sharing the drive portion for the rotation of the filter and for the rotation of the fan.

Preferably, the drive portion drives at least one of the filter and the nozzle to cause a relative speed between the filter and the nozzle to be a first speed, when the mist is collected by the filter, and to cause the relative speed between the filter and the nozzle to be a second speed that is slower than the first speed, when the fluid is ejected from the ejection port toward the filter.

According to the mist collector configured as described above, it is possible to efficiently clean the filter by setting the relative speed between the filter and the nozzle to the second speed slower than the first speed, when the fluid is ejected from the ejection port toward the filter.

Preferably, the nozzle is disposed on a downstream side of the filter, in a flow direction of an airflow passing through the filter.

According to the mist collector configured as described above, the clogging of the filter occurs mainly on an upstream side in the flow direction of the airflow passing through the filter. It is thus possible to more effectively prevent the clogging of the filter by ejecting the fluid toward the filter from the downstream side in the flow direction of the airflow passing through the filter.

A machine tool according to the present invention includes a cover body that defines a machining area, and a mist collector that is connected to the cover body and into which mist generated in the machining area is guided.

According to the machine tool configured as described above, it is possible to efficiently collect the mist generated in the machining area by using the mist collector.

Advantageous Effects of Invention

As described above, according to the present invention, it is possible to provide a mist collector that can prevent clogging of a filter, and a machine tool that includes such a mist collector.

DESCRIPTION OF EMBODIMENT

Figure 1:
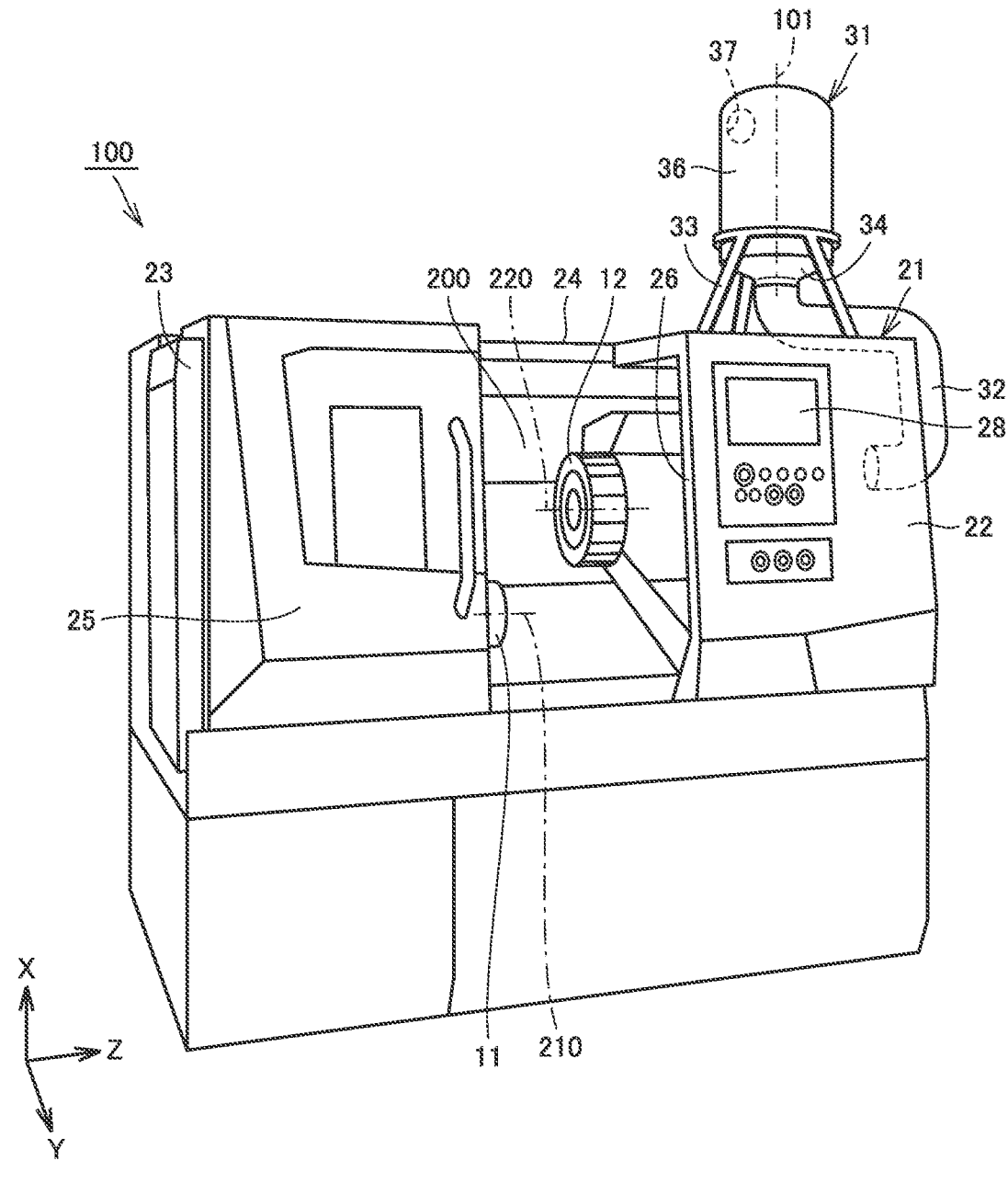
FIG. 1 is a perspective view illustrating a machine tool.

An embodiment of the present invention will be described with reference to the drawings. In the drawings referred to below, the same or corresponding members are denoted by the same reference numerals or the like.

FIG. 1 is a perspective view illustrating a machine tool. Referring to FIG. 1, a machine tool 100 is a lathe that performs workpiece machining by bringing a tool into contact with a rotating workpiece. Machine tool 100 is a numerically-controlled (NC) machine tool in which various operations for the workpiece machining are automated by numerical control performed by a computer.

In the present description, the following axes are defined for convenience of describing a structure of machine tool 100. That is, an axis that is parallel to a left-right direction (width direction) of machine tool 100 and that extends in a horizontal direction is referred to as a "Z-axis". An axis that is parallel to a front-rear direction (depth direction) of machine tool 100 and that extends in a horizontal direction is referred to as a "Y-axis". An axis that extends in a vertical direction is referred to as an "X-axis".

First, an overall structure of machine tool 100 using a mist collector 31 in the present embodiment will be described.

Machine tool 100 includes a cover body 21. Cover body 21 defines a machining area 200, and forms an outer appearance of machine tool 100. Machining area 200 is a space in which machining of a workpiece is performed. Machining area 200 is sealed such that foreign matter such as chips or cutting oil associated with the workpiece machining does not leak to the outside of machining area 200.

In machining area 200, a workpiece spindle 11 and a turret-type tool rest 12 are disposed. Workpiece spindle 11 rotates the workpiece about a rotation center axis 210 parallel to the Z-axis. Tool rest 12 holds a plurality of tools, and is pivotable about a pivot center axis 220 parallel to a Z-axis direction. Tool rest 12 is movable in the Z-axis direction and an oblique direction including a Y-axis direction component and an X-axis direction component. In machining area 200, a tailstock supporting a rotation center of the workpiece, or an opposite workpiece spindle disposed opposite to workpiece spindle 11 in the Z-axis direction may be further disposed.

An opening portion 26 is provided in cover body 21. Opening portion 26 allows machining area 200 to be open to the external space.

Cover body 21 includes a first side cover 22, a second side cover 23, and a ceiling cover 24.

Each of first side cover 22 and second side cover 23 is provided on a corresponding one of both sides of opening portion 26 in the Z-axis direction. First side cover 22 is provided with an operation panel 28. Operation panel 28 includes various buttons and switches used when an operator operates machine tool 100, and a display portion indicating a machining state of the workpiece in machine tool 100 or the like. Workpiece spindle 11 and the like are disposed on an inner side of second side cover 23.

Ceiling cover 24 is disposed on a ceiling of machine tool 100. Opening portion 26 is defined by first side cover 22, second side cover 23, and ceiling cover 24.

Machine tool 100 further includes a door portion 25. Door portion 25 is provided in opening portion 26. Door portion 25 is slidable in the Z-axis direction between an opened position (a position of door portion 25 illustrated in FIG. 1) at which opening portion 26 is brought into an opened state and a closed position at which opening portion 26 is brought into a closed state. When door portion 25 is positioned at the opened position, door portion 25 is disposed so as to overlap with second side cover 23. When door portion 25 is positioned at the closed position, door portion 25 defines machining area 200.

Machine tool 100 further includes mist collector 31. Mist collector 31 is connected to cover body 21. Oil mist, which is a coolant in a mist form, is guided from machining area 200 into mist collector 31. Mist collector 31 is a device that collects the oil mist contained in the air and that discharges clean air.

Mist collector 31 includes a case body 36. Case body 36 is formed of a casing that forms an outer appearance of mist collector 31. Case body 36, as a whole, has a cylindrical shape centered on a virtual center axis 101.

Case body 36 is provided with an intake port 34 and an exhaust port 37. Intake port 34 and exhaust port 37 are provided apart from each other in an axial direction of center axis 101. Intake port 34 is open toward the axial direction of center axis 101 at one end of case body 36 in the axial direction of center axis 101. Case body 36 has a tapered shape whose diameter is reduced in a position where intake port 34 is open. Exhaust port 37 is open toward a radially outer side of center axis 101 at the other end of case body 36 in the axial direction of center axis 101.

Mist collector 31 is connected to cover body 21 via a duct 32. A space inside case body 36 communicates with machining area 200 via duct 32. Duct 32 has one end, which is connected to intake port 34, and duct 32 also has the other end, which is connected to first side cover 22. A portion of cover body 21 to which duct 32 is connected is not particularly limited, and may be ceiling cover 24, for example.

Mist collector 31 is installed on ceiling cover 24. Mist collector 31 is supported on ceiling cover 24 by support legs 33. Mist collector 31 is supported in a manner such that center axis 101 extends in an up-down direction. Mist collector 31 is supported in a manner such that intake port 34 is open downward and exhaust port 37 is disposed above intake port 34.

Figure 2:
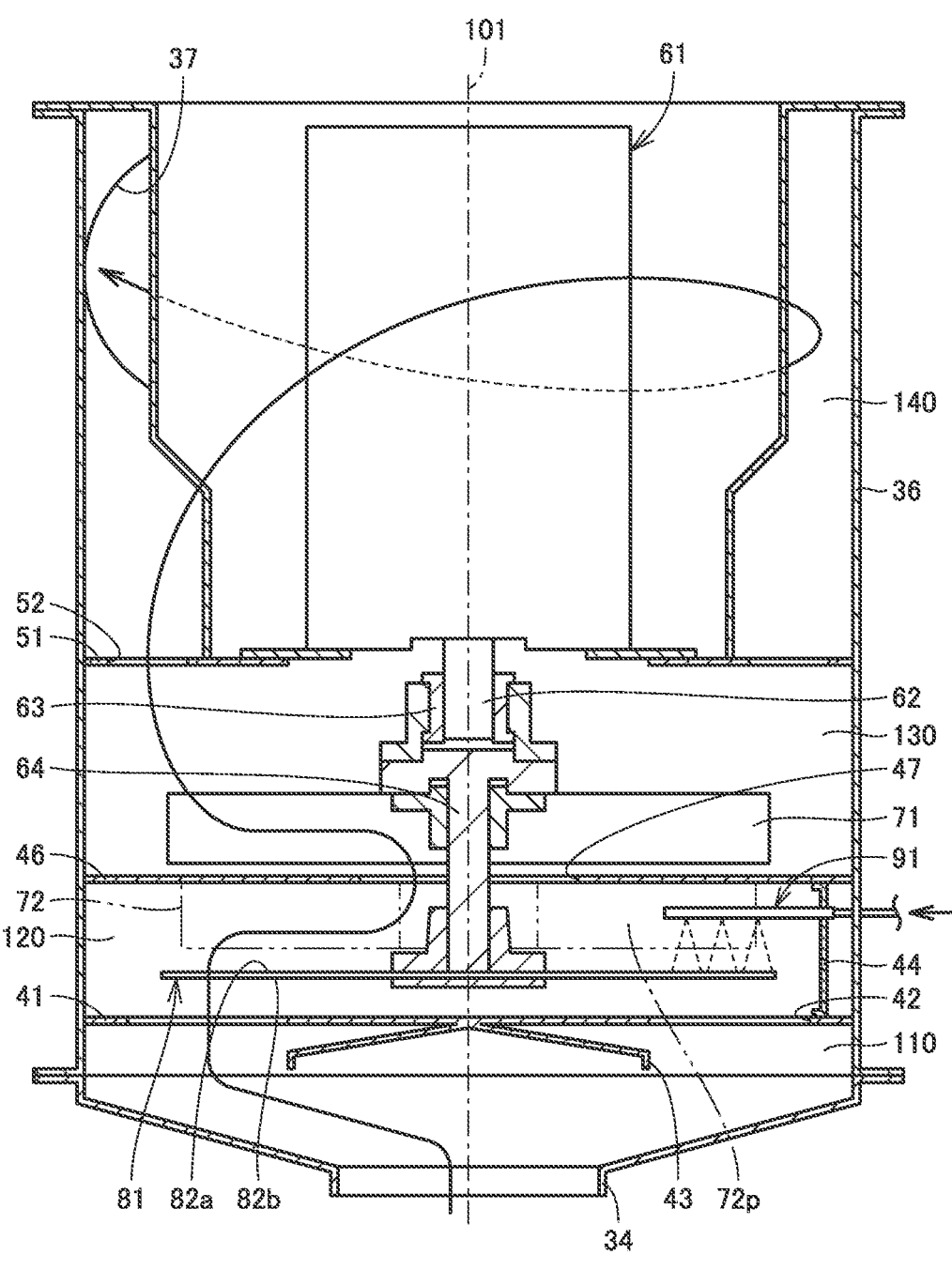
FIG. 2 is a cross-sectional view illustrating a mist collector in FIG. 1.

Next, a structure of mist collector 31 will be described in detail. FIG. 2 is a cross-sectional view illustrating the mist collector in FIG. 1.

Referring to FIG. 2, mist collector 31 further includes a first partition portion 41, a second partition portion 46, and a third partition portion 51. First partition portion 41, second partition portion 46, and third partition portion 51 are provided in case body 36. Each of first partition portion 41, second partition portion 46, and third partition portion 51 is formed of a flat plate orthogonal to center axis 101. Each of first partition portion 41, second partition portion 46, and third partition portion 51 is disposed parallel to a horizontal plane.

First partition portion 41, second partition portion 46, and third partition portion 51 are arranged at intervals in the up-down direction (the axial direction of center axis 101). First partition portion 41 is provided above intake port 34. Second partition portion 46 is provided above first partition portion 41. Third partition portion 51 is provided above second partition portion 46.

A first internal space 110 is formed below first partition portion 41. Intake port 34 is open to first internal space 110. A second internal space 120 is formed between first partition portion 41 and second partition portion 46. A third internal space 130 is formed between second partition portion 46 and third partition portion 51. A fourth internal space 140 is formed above third partition portion 51. Exhaust port 37 is open to fourth internal space 140.

Mist collector 31 further includes a collision plate 43. Collision plate 43 is provided in first internal space 110. Collision plate 43 is provided so as to protrude downward from first partition portion 41, in the axial direction of center axis 101. Collision plate 43 has a saucer shape that is open downward. Collision plate 43 has a conical saucer shape centered on center axis 101. An opening formed by collision plate 43 is opposite to an opening formed by intake port 34 with respect to case body 36, in the axial direction of center axis 101.

A first opening portion 42 is provided in first partition portion 41. First opening portion 42 is formed of a through hole extending through first partition portion 41 in the axial direction of center axis 101. First opening portion 42 allows first internal space 110 and second internal space 120 to communicate with each other. First opening portion 42 is provided at a position shifted from a position of collision plate 43, when viewed in the axial direction of center axis 101. First opening portion 42 is provided along an outer periphery of collision plate 43, when viewed in the axial direction of center axis 101.

Figure 3:
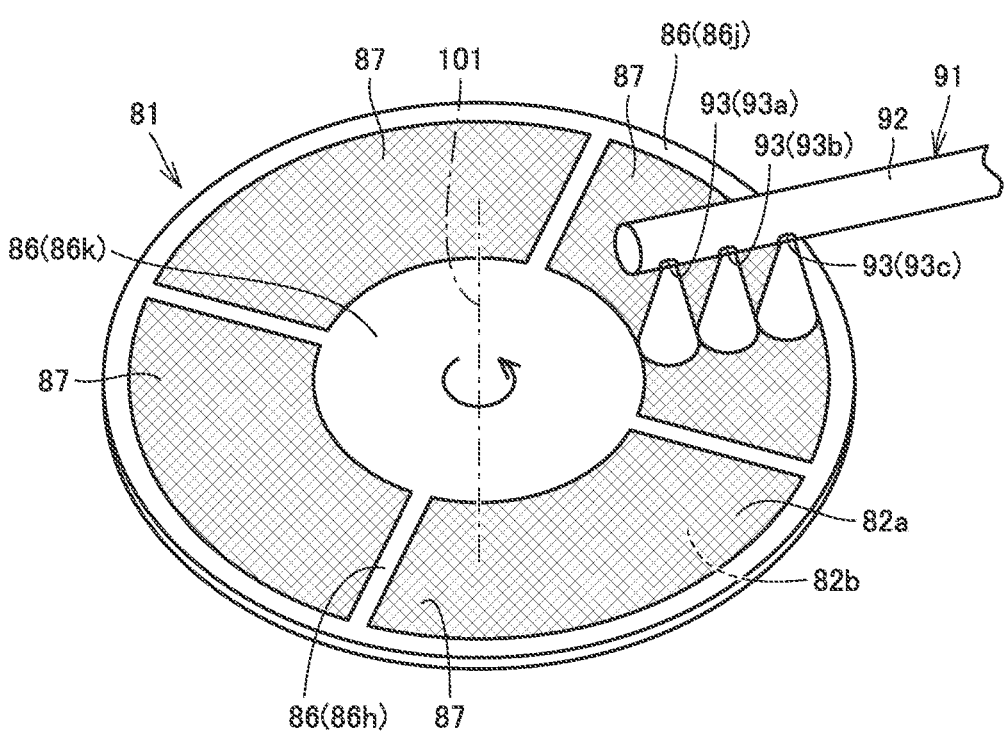
FIG. 3 is a perspective view illustrating a filter and a nozzle at a time of cleaning the filter.
Figure 4:
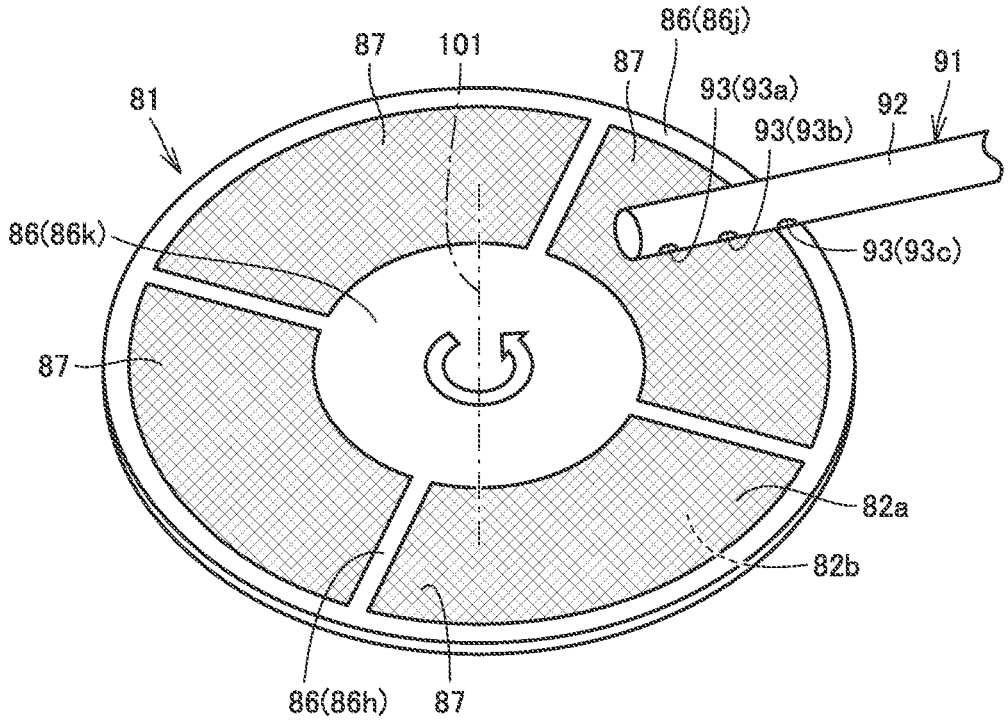
FIG. 4 is a perspective view illustrating the filter and the nozzle at a time of collecting oil mist.

FIG. 3 is a perspective view illustrating a filter and a nozzle at a time of cleaning the filter. FIG. 4 is a perspective view illustrating the filter and the nozzle at a time of collecting the oil mist.

Referring to FIGS. 2 to 4, mist collector 31 further includes a filter 81. Filter 81 is configured to be able to collect the oil mist.

Filter 81 is disposed in second internal space 120. Filter 81 has a disk shape centered on center axis 101. Filter 81 includes a first filter surface 82a and a second filter surface 82b. Each of first filter surface 82a and second filter surface 82b is formed of a plane surface orthogonal to center axis 101. First filter surface 82a is opposite to second partition portion 46 in the axial direction of center axis 101. Second filter surface 82b is opposite to first partition portion 41, in the axial direction of center axis 101.

As illustrated in FIGS. 3 and 4, filter 81 includes filter body portions 87 and a frame portion 86. Each filter body portion 87 is a body portion of filter 81 that collects the oil mist. Filter body portion 87 is formed of a mesh body having a mesh shape in which fine holes are arranged. Filter body portion 87 has a mesh size (minimum size of each hole), which may be within a range of being greater than or equal to 30 μm to less than or equal to 1000 or within a range of being greater than or equal to 50 μm to less than or equal to 80 Frame portion 86 is a holder that holds filter body portion 87.

Frame portion 86 includes a disk portion 86k, a ring portion 86j, and connection portions 86h. Disk portion 86k has a disk shape centered on center axis 101. Disk portion 86k has a diameter smaller than a diameter of filter 81. Ring portion 86j has a ring shape centered on center axis 101. Ring portion 86j is provided so as to circle along an outer circumferential edge of filter 81. Each connection portion 86h connects disk portion 86k and ring portion 86j. Connection portion 86h extends linearly. Connection portion 86h has one end, which is connected to disk portion 86k, and connection portion 86h also has the other end, which is connected to ring portion 86j.

Filter body portion 87 is held by disk portion 86k, ring portion 86j, and connection portion 86h. Filter body portion 87 is provided in a region that is located between disk portion 86k and ring portion 86j and that circles around center axis 101 in a manner of a belt. Filter body portion 87 is opposite to first opening portion 42 in the axial direction of center axis 101.

In FIGS. 3 and 4, four connection portions 86h are illustrated, which extend in the radial direction of center axis 101. However, the number and layout of connection portions 86h are not particularly limited. For example, the plurality of connection portions 86h may be provided in a grid pattern between disk portion 86k and ring portion 86j.

Mist collector 31 further includes a nozzle 91. Nozzle 91 includes ejection ports 93. Each ejection port 93 forms an opening through which a fluid can be ejected. Nozzle 91 is disposed so as to cause each ejection port 93 to be opposite to filter 81. Nozzle 91 is fixed.

Nozzle 91 is disposed in second internal space 120. Nozzle 91 is disposed between filter 81 and second partition portion 46, in the axial direction of center axis 101. Nozzle 91 is disposed on a downstream side of filter 81, in a flow direction of an airflow passing through filter 81. Each ejection port 93 is opposite to first filter surface 82a. Each ejection port 93 is opposite to filter body portion 87. Each ejection port 93 has a circular opening shape.

A support member 44 is further provided in second internal space 120. Support member 44 has a wall shape extending in the axial direction of center axis 101 between first partition portion 41 and second partition portion 46. Support member 44 is provided at a position that is spaced from filter 81 and that is located toward the radially outer side of center axis 101 with respect to filter 81. Nozzle 91 is supported by support member 44. Nozzle 91 is fixed in second internal space 120 by being supported by support member 44.

Nozzle 91 extends in the radial direction of center axis 101. Nozzle 91 is provided such that a distance between nozzle 91 and filter 81 in the axial direction of center axis 101 is constant, regardless of a position of nozzle 91 in the radial direction of center axis 101.

As illustrated in FIGS. 3 and 4, nozzle 91 includes the plurality of ejection ports 93 (93a, 93b, 93c). The plurality of ejection ports 93 (93a, 93b, 93c) are arranged along the radial direction of center axis 101. Ejection port 93a, ejection port 93*b*, and ejection port 93*c* are arranged in this order from a radially inner side to the radially outer side of center axis 101.

A coolant is supplied to nozzle 91. Specifically, a coolant from a coolant tank annexed to machine tool 100 is supplied to nozzle 91. The coolant supplied to nozzle 91 is ejected onto filter 81 (filter body portion 87) through each ejection port 93. The fluid ejected onto filter 81 through ejection port 93 is not limited to the coolant, and may be air, for example.

Referring to FIG. 2, a flow adjustment fan 72 is further disposed in second internal space 120. Flow adjustment fan 72 is disposed between filter 81 and second partition portion 46, in the axial direction of center axis 101. Flow adjustment fan 72 is a stationary-type fan, and serves as stationary blades that adjust an airflow formed along with rotation of a fan 71 described later. Flow adjustment fan 72 is fixed to second partition portion 46.

Nozzle 91 is provided at a position overlapping with flow adjustment fan 72, in the axial direction and the radial direction of center axis 101. Flow adjustment fan 72 includes a plurality of blades 72*p*. Nozzle 91 is disposed in a space between ones of the plurality of blades 72*p* adjacent to each other.

A second opening portion 47 is provided in second partition portion 46. Second opening portion 47 is formed of a through hole extending through second partition portion 46 in the axial direction of center axis 101. Second opening portion 47 allows second internal space 120 and third internal space 130 to communicate with each other. Second opening portion 47 forms a circular opening centered on center axis 101. The opening formed by second opening portion 47 is opposite to disk portion 86*k* of filter 81, in the axial direction of center axis 101.

Mist collector 31 further includes a motor 61 (drive portion) and a shaft 64. Motor 61 causes filter 81 to move so as to cause respective positions on filter 81 to which ejection ports 93 of nozzle 91 are opposite to change.

Motor 61 is provided in fourth internal space 140. Motor 61 includes an output shaft 62 that outputs rotation. Output shaft 62 extends on center axis 101, and also extends toward third internal space 130. Motor 61 is provided such that a rotation center of output shaft 62 coincides with center axis 101.

Shaft 64 extends between second internal space 120 and third internal space 130 while shaft 64 passes through second opening portion 47. Shaft 64 extends on center axis 101. Shaft 64 connects motor 61 (output shaft 62) and filter 81. Shaft 64 has one end, which is connected to output shaft 62 via a coupling 63. Shaft 64 also has the other end, which is connected to filter 81. Specifically, the other end of shaft 64 is connected to disk portion 86*k*.

A third opening portion 52 is provided in third partition portion 51. Third opening portion 52 is formed of a through hole extending through third partition portion 51 in the axial direction of center axis 101. Third opening portion 52 allows third internal space 130 and fourth internal space 140 to communicate with each other. Third opening portion 52 is provided along an outer periphery of motor 61, when viewed in the axial direction of center axis 101.

Mist collector 31 further includes fan 71. Fan 71 serves as moving blades that generate the airflow passing through filter 81 (filter body portion 87).

Fan 71 is provided in third internal space 130. Fan 71 is disposed between motor 61 (output shaft 62) and filter 81, in the axial direction of center axis 101. Fan 71 is connected to shaft 64 between output shaft 62 and filter 81.

When motor 61 is driven, the rotation output from output shaft 62 is transmitted to fan 71 and filter 81 via shaft 64. As a result, fan 71 and filter 81 are caused to rotate about center axis 101. When fan 71 is caused to rotate, an airflow is formed, which flows from intake port 34 to exhaust port 37, indicated by an arrow in FIG. 2, in case body 36.

With the rotation of fan 71, the air containing the oil mist generated in machining area 200 is guided into mist collector 31 via duct 32 illustrated in FIG. 1. The air enters first internal space 110 through intake port 34. At this time, the air collides with collision plate 43. This removes the chips and the like contained in the air.

The air enters second internal space 120 from first internal space 110 through first opening portion 42. The air passes through filter 81 (filter body portion 87) that is caused to rotate about center axis 101, in second internal space 120. At this time, while the air passes through the mesh of filter body portion 87, the oil mist contained in the air collides with filter body portion 87 that is caused to rotate at a high speed. The oil mist thus cannot pass through the mesh of filter body portion 87. As a result, the air and the oil mist are separated. The separated oil mist is collected in machining area 200 of machine tool 100 or in the coolant tank through a drain (not illustrated).

The air from which the oil mist has been separated enters third internal space 130 through second opening portion 47. Then, the air further enters fourth internal space 140 through third opening portion 52. The air flows spirally around center axis 101 in fourth internal space 140. Then, the air is discharged to the external space through exhaust port 37.

Note that a final filter may be further provided in exhaust port 37. The air discharged from exhaust port 37 may be returned into machining area 200 of machine tool 100.

When the oil mist is repeatedly collected, clogging occurs in filter 81 (filter body portion 87) due to the fine chips and the like guided into mist collector 31 along with the oil mist. In contrast, in the present embodiment, the coolant is supplied to nozzle 91 while filter 81 is caused to rotate by the driving of motor 61, as illustrated in FIGS. 2 and 3. As a result, the coolant is ejected from ejection ports 93 toward filter 81 while the respective positions on filter 81 to which ejection ports 93 of nozzle 91 are opposite are caused to change. Filter 81 is thus cleaned by the coolant, and this can prevent clogging of filter 81.

In the present embodiment, the plurality of ejection ports 93 (93*a*, 93*b*, 93*c*) are arranged along the radial direction of center axis 101. With such a configuration, the respective positions on filter 81 (filter body portion 87) to which the plurality of ejection ports 93 (93*a*, 93*b*, 93*c*) are opposite are arranged along the radial direction of center axis 101, which is the rotation center of filter 81. These positions are caused to move along a circumferential direction of center axis 101, along with the rotation of filter 81. The coolant can be thus efficiently supplied over a wider area of filter 81 (filter body portion 87).

In the present embodiment, nozzle 91 is disposed on the downstream side of filter 81, in the flow direction of the airflow passing through filter 81.

The clogging of filter 81 occurs mainly on the filter surface (second filter surface 82*b*) on an upstream side in the flow direction of the airflow passing through filter 81. The clogging of filter 81 can be thus more effectively eliminated by causing the coolant to be ejected from nozzle 91 toward first filter surface 82*a* on the opposite side of second filter surface 82*b*.

The cleaning operation of filter 81, described above, may be automatically performed at a timing after collecting operation of the oil mist is performed for a certain period of time, or may be performed when an instruction from the operator is received via operation panel 28. The cleaning operation of filter 81 may be performed at a timing when a flow rate of the air flowing through case body 36 is less than or equal to a predetermined value, after an air flowmeter is provided in case body 36.

As illustrated in FIGS. 3 and 4, motor 61 may rotationally drive filter 81 so as to cause a rotation speed of filter 81 when filter 81 is cleaned to be slower than a rotation speed of filter 81 when the oil mist is collected. With such a configuration, the coolant can be more reliably supplied to each position of filter 81 (filter body portion 87) in the cleaning operation of filter 81. Filter 81 can be thus efficiently cleaned.

A circumferential speed of filter body portion 87 when the oil mist is collected by filter 81 may be greater than or equal to 10 m/s, or greater than or equal to 50 m/s. A circumferential speed of filter body portion 87 when filter 81 is cleaned may be less than or equal to 1 m/s, or less than or equal to 0.1 m/s.

In the present invention, a filter may be fixed, and a position on the filter to which an ejection port of a nozzle is opposite may be caused to change by causing the nozzle to move with respect to the filter. Alternatively, a position on a filter to which an ejection port of a nozzle is opposite may be caused to change by causing both the filter and the nozzle to move with respect to each other. The movement of a filter and/or a nozzle is not limited to rotation movement, and may be, for example, movement reciprocating along a linear direction, or movement repeatedly circulating along a predetermined course such as a rectangular course or a circumferential course. The movement of a filter and/or a nozzle is preferably movement in an in-plane direction of a filter surface to which an ejection port is opposite.

In the present invention, a fluid ejected through an ejection port is not particularly limited, and may be air, for example.

Figure 5:
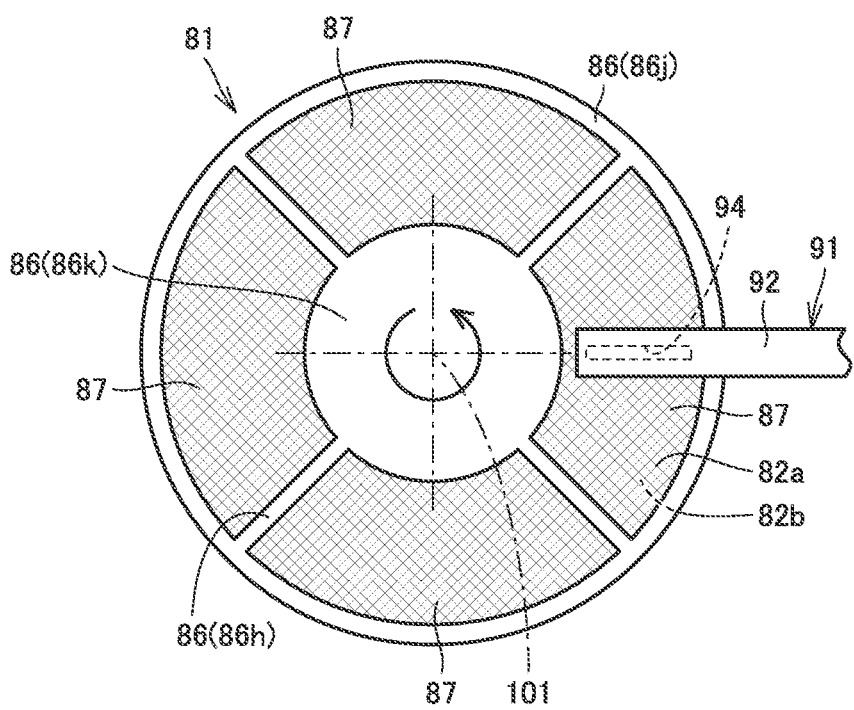
FIG. 5 is a top view illustrating a first modification of the nozzle in FIGS. 3 and 4.

Each of FIGS. 5 to 8 is a top view illustrating a corresponding one of modifications of the nozzle in FIGS. 3 and 4. Referring to FIG. 5, nozzle 91 includes an ejection port 94, in the present modification. Ejection port 94 has a slit shape whose longitudinal direction extends in the radial direction of center axis 101 and whose width direction extends in the circumferential direction of center axis 101.

Figure 6:
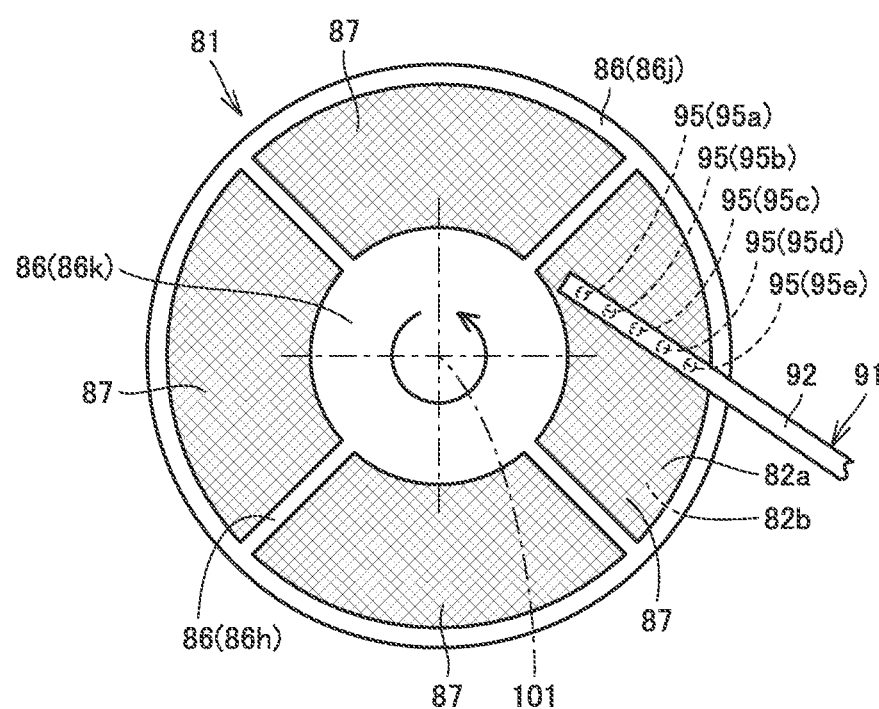
FIG. 6 is a top view illustrating a second modification of the nozzle in FIGS. 3 and 4.

Referring to FIG. 6, nozzle 91 extends in the radial direction of center axis 101 while nozzle 91 is displaced in the circumferential direction of center axis 101, in the present modification. Nozzle 91 includes a plurality of ejection ports 95 (95a, 95b, 95c, 95d, 95e). The plurality of ejection ports 95 (95a, 95b, 95c, 95d, 95e) are arranged along a straight line extending in the radial direction of center axis 101 while being displaced in the circumferential direction of center axis 101.

Figure 7:
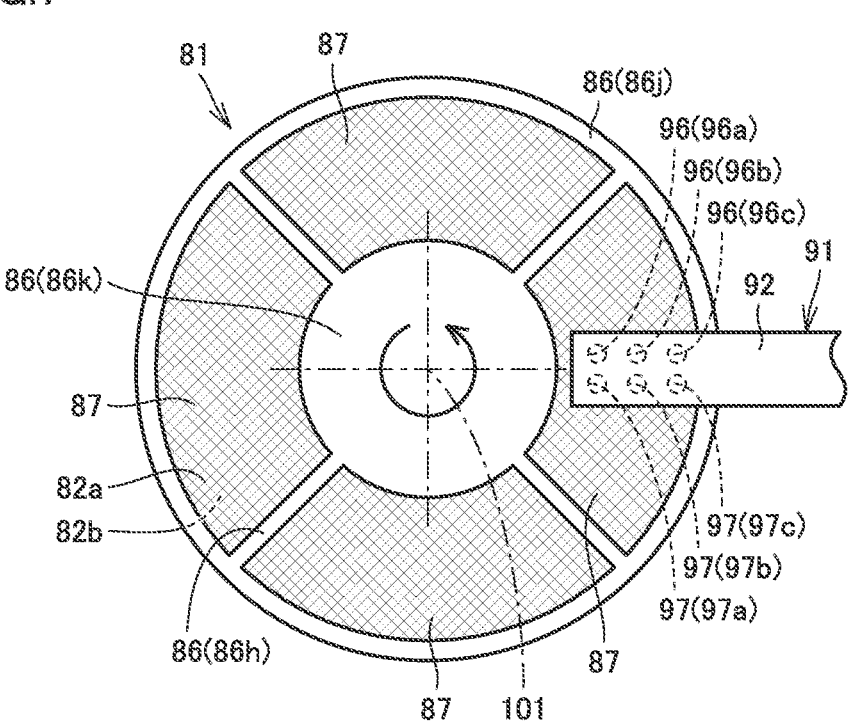
FIG. 7 is a top view illustrating a third modification of the nozzle in FIGS. 3 and 4.

Referring to FIG. 7, nozzle 91 includes a plurality of first ejection ports 96 (96a, 96b, 96c) and a plurality of second ejection ports 97 (97a, 97b, 97c), in the present modification. The plurality of first ejection ports 96 (96a, 96b, 96c) are arranged along the radial direction of center axis 101. The plurality of second ejection ports 97 (97a, 97b, 97c) are arranged along the radial direction of center axis 101. First ejection port 96a, first ejection port 96b, and first ejection port 96c are arranged side by side in the circumferential direction of center axis 101 with second ejection port 97a, second ejection port 97b, and second ejection port 97c, respectively.

As illustrated in the respective modifications in FIGS. 5 to 7, the number of ejection ports provided in nozzle 91 may be one or plural. An opening shape and arrangement of the ejection ports provided in nozzle 91 are not particularly limited. For example, the slit-shaped ejection port 94 illustrated in FIG. 5 may be provided in a plural manner such that this plurality of ejection ports 94 is arranged in the circumferential direction of center axis 101. Alternatively, the plurality of first ejection ports 96 and the plurality of second ejection ports 97a illustrated in FIG. 7 may be arranged in a zigzag manner along the radial direction of center axis 101.

Figure 8:
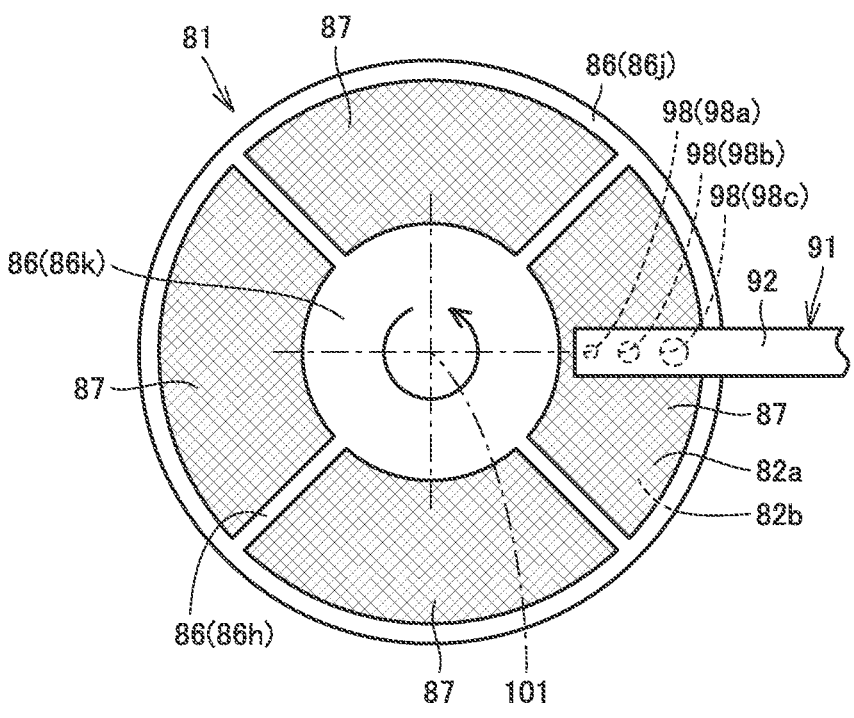
FIG. 8 is a top view illustrating a fourth modification of the nozzle in FIGS. 3 and 4.

Referring to FIG. 8, nozzle 91 includes a plurality of ejection ports 98 (98a, 98b, 98c), in the present modification. The plurality of ejection ports 98 (98a, 98b, 98c) are arranged along the radial direction of center axis 101. Ejection port 98a, ejection port 98b, and ejection port 98c are arranged in this order from the radially inner side to the radially outer side of center axis 101.

Ejection port 98a, ejection port 98b, and ejection port 98c include respective openings having different sizes. An opening area of ejection port 98b is larger than an opening area of ejection port 98a, and an opening area of ejection port 98c is larger than the opening area of ejection port 98b.

As illustrated in the modification in FIG. 8, the ejection ports provided in nozzle 91 may be provided in forms different from one another. For example, a configuration may be made such that the opening area of ejection port 98b in FIG. 8 is smaller than the opening area of ejection port 98a, and the opening area of ejection port 98c is smaller than the opening area of ejection port 98b. A configuration may be made such that a distance between ejection port 98a in FIG. 8 and filter 81, a distance between ejection port 98b in FIG. 8 and filter 81, and a distance between ejection port 98c in FIG. 8 and filter 81 may be different from one another.

Figure 9:
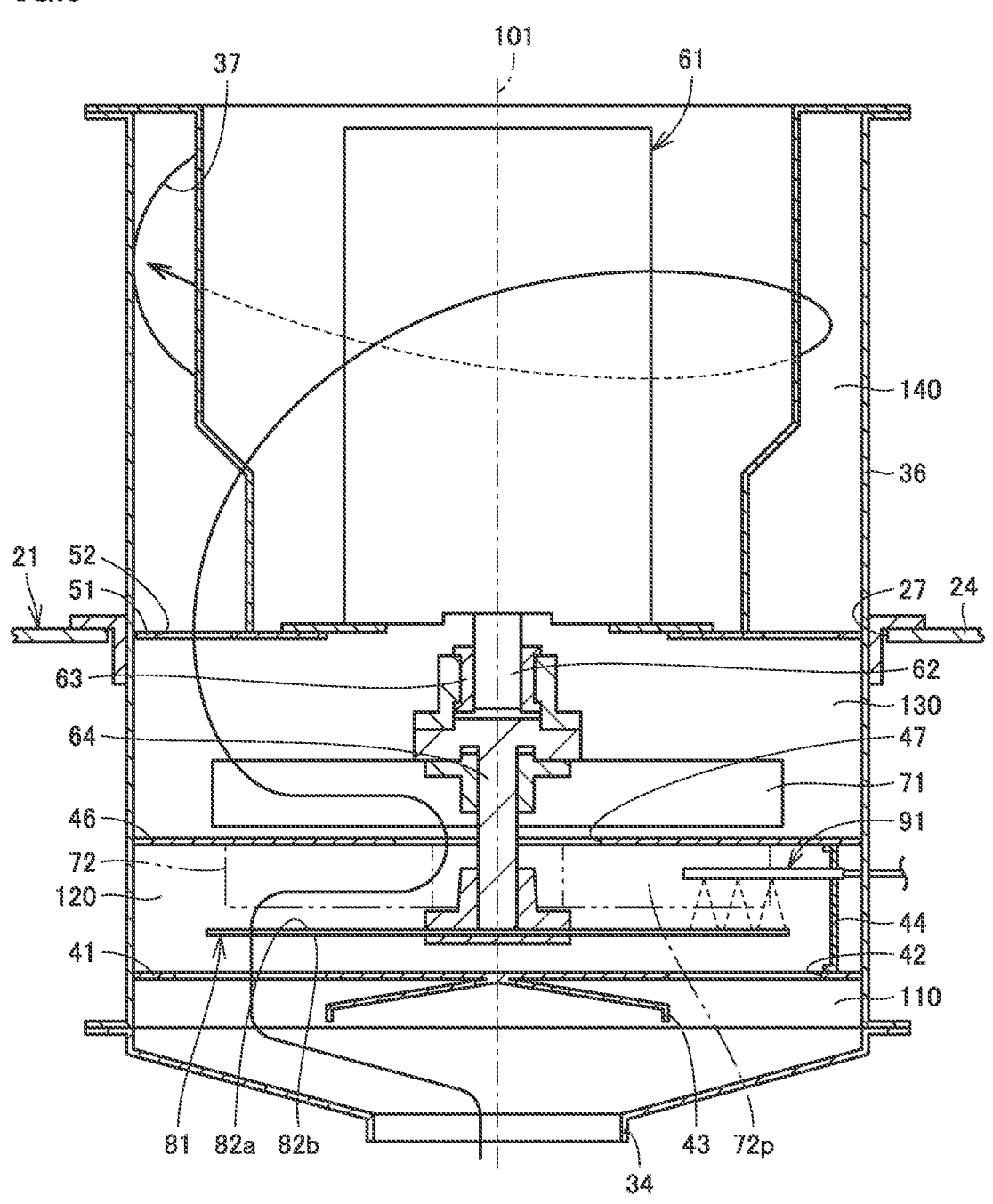
FIG. 9 is a cross-sectional view illustrating a modification of a mode in which the mist collector in FIG. 2 is installed in a machine tool.

FIG. 9 is a cross-sectional view illustrating a modification of a mode in which the mist collector in FIG. 2 is installed in a machine tool. Referring to FIG. 9, mist collector 31 is directly connected to cover body 21 without using duct 32 illustrated in FIG. 1, in the present modification.

Specifically, mist collector 31 is connected to ceiling cover 24. An opening portion 27 is provided in ceiling cover 24. Opening portion 27 is formed of a through hole extending through ceiling cover 24 in the up-down direction. Mist collector 31 is fastened to ceiling cover 24 while mist collector 31 is inserted into opening portion 27.

A part of mist collector 31 is located inside machining area 200, and the other part of mist collector 31 is located outside machining area 200. A position of opening portion 27 in the up-down direction corresponds to a position of third partition portion 51 in the up-down direction. Intake port 34 is open inside machining area 200.

The position of opening portion 27 in the up-down direction may correspond to any of a position of first partition portion 41 in the up-down direction and a position of second partition portion 46 in the up-down direction. The position of opening portion 27 in the up-down direction may correspond to any of respective positions of first internal space 110, second internal space 120, third internal space 130, and fourth internal space 140, in the up-down direction.

With such a configuration, a coolant including chips discharged in the cleaning operation of filter 81 can be returned into machining area 200 of machine tool 100 without remaining in case body 36 of mist collector 31.

Regarding an installation site of mist collector 31, mist collector 31 may be installed on a floor, in a factory or the like, on which machine tool 100 is installed. In the present embodiment, the description has been made for the structure of mist collector 31 of a vertical type in which an axial direction of case body 36 extends in the up-down direction.

However, the present invention is also applicable to a horizontal type mist collector in which the axial direction of case body 36 extends in the horizontal direction.

The machine tool using mist collector 31 in the present embodiment is not limited to a lathe, and may be a machining center, a multi-functional processing machine having a turning function and a milling function, an AM/SM hybrid processing machine capable of performing additive manufacturing (AM) processing for a workpiece and subtractive manufacturing (SM) processing for a workpiece, or the like.

It should be understood that the embodiment disclosed herein is illustrative in all respects and is not restrictive. The scope of the present invention is defined not by the above description but by the claims, and is intended to include meanings equivalent to the claims and all modifications within the scope.

INDUSTRIAL APPLICABILITY

The present invention is applicable to, for example, a mist collector used in a machine tool.

REFERENCE SIGNS LIST

11: workpiece spindle, 12: tool rest, 21: cover body, 22: first side cover, 23: second side cover, 24: ceiling cover, 25: door portion, 26, 27: opening portion, 28: operation panel, 31: mist collector, 32: duct, 33: support leg, 34: intake port, 36: case body, 37: exhaust port, 41: first partition portion, 42: first opening portion, 43: collision plate, 44: support member, 46: second partition portion, 47: second opening portion, 51: third partition portion, 52: third opening portion, 61: motor, 62: output shaft, 63: coupling, 64: shaft, 71: fan, 72: flow adjustment fan, 72*p*: blade, 81: filter, 82*a*: first filter surface, 82*b*: second filter surface, 86: frame portion, 86*h*: connection portion, 86*j*: ring portion, 86*k*: disk portion, 87: filter body portion, 91: nozzle, 93, 93*a*, 93*b*, 93*c*, 94, 95, 98, 98*a*, 98*b*, 98*c*: ejection port, 96, 96*a*, 96*b*, 96*c*: first ejection port, 97, 97*a*, 97*b*, 97*c*: second ejection port, 100: machine tool, 101: center axis, 110: first internal space, 120: second internal space, 130: third internal space, 140: fourth internal space, 200: machining area, 210: rotation center axis, 220: pivot center axis

The invention claimed is:

1. A mist collector comprising:
a filter that collects mist;
a nozzle including a first ejection port capable of ejecting a fluid, the nozzle being disposed to cause the first ejection port to be facing the filter; and a drive portion that causes at least one of the filter and the nozzle to move, to cause a position on the filter to which the first ejection port is opposite to change, wherein
the drive portion drives at least one of the filter and the nozzle to:
cause a relative speed of the relative movement between the filter and the nozzle to be a first speed, when mist is collected by the filter; and
cause the relative speed of the relative movement between the filter and the nozzle to be a second speed that is slower than the first speed, when fluid is ejected from the first ejection port toward the filter.

2. The mist collector according to claim 1, wherein
the nozzle is fixed, and
the drive portion causes the filter to move.

3. The mist collector according to claim 1, wherein
the filter has a disk shape centered on a predetermined axis, and includes a filter surface orthogonal to the predetermined axis, and
the drive portion causes the filter to rotate about the predetermined axis.

4. The mist collector according to claim 3, further comprising a fan that generates an airflow passing through the filter,
wherein the drive portion causes the fan to rotate while the drive portion causes the filter to rotate.

5. The mist collector according to claim 1, wherein
an airflow passes through the filter in a flow direction, and
the nozzle is disposed on a downstream side of the filter in the flow direction.

6. A machine tool comprising:
a cover body that defines a machining area; and
the mist collector according to claim 1 that is connected to the cover body and into which mist generated in the machining area is guided.

7. A mist collector comprising:
a filter that collects mist;
a nozzle including a first ejection port capable of ejecting a fluid, the nozzle being disposed to cause the first ejection port to be facing the filter; and
a drive portion that causes at least one of the filter and the nozzle to move, to cause a position on the filter to which the first ejection port is opposite to change,
wherein the nozzle includes a second ejection port, and
the first and second ejection ports arranged along a radial direction of the predetermined axis.

* * * * *